United States Patent
Zhao et al.

(10) Patent No.: US 10,804,613 B2
(45) Date of Patent: Oct. 13, 2020

(54) 5G MIMO ANTENNA STRUCTURE

(71) Applicant: SHENZHEN SUNWAY COMMUNICATION CO., LTD., Shenzhen, Guangdong (CN)

(72) Inventors: Anping Zhao, Shenzhen (CN); Zhouyou Ren, Shenzhen (CN)

(73) Assignee: SHENZHEN SUNWAY COMMUNICATION CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/474,825

(22) PCT Filed: May 29, 2018

(86) PCT No.: PCT/CN2018/088831
§ 371 (c)(1),
(2) Date: Jun. 28, 2019

(87) PCT Pub. No.: WO2019/196172
PCT Pub. Date: Oct. 17, 2019

(65) Prior Publication Data
US 2019/0348765 A1    Nov. 14, 2019

(30) Foreign Application Priority Data
Apr. 8, 2018    (CN) .............................. 2018 0 305369

(51) Int. Cl.
*H01Q 7/00* (2006.01)
*H01Q 1/38* (2006.01)
(Continued)

(52) U.S. Cl.
CPC ........... *H01Q 13/10* (2013.01); *H01Q 1/2283* (2013.01); *H01Q 1/242* (2013.01); *H04B 7/0413* (2013.01)

(58) Field of Classification Search
CPC .......... H01Q 1/521; H01Q 1/243; H01Q 9/30; H01Q 5/10; H01Q 1/38; H01Q 21/06;
(Continued)

(56) References Cited

U.S. PATENT DOCUMENTS 6,683,574 B2 *   1/2004   Su ............................ H01Q 9/42
                                                    343/700 MS
7,973,718 B2 *   7/2011   Mak ..................... H01Q 1/2283
                                                    343/700 MS
(Continued)

FOREIGN PATENT DOCUMENTS

CN          102832461 A     12/2012
CN          105811087 A      7/2016
(Continued)

OTHER PUBLICATIONS

Sep. 27, 2018 International Search Report issued in International Patent Application No. PCT/CN2018/088831.

*Primary Examiner* — Pablo N Tran
(74) *Attorney, Agent, or Firm* — Oliff PLC (57) ABSTRACT

A 5G MIMO antenna structure includes a PCB and more than one first antenna assembly arranged on the PCB at intervals. Each first antenna assembly includes a feed branch, a first radiator and two second radiators, wherein the first radiator and the two second radiators are coupled to the feed branch, the first radiator is of an inverted U-structure and has two tail ends connected to grounding points of the PCB, the feed branch is located in the first radiator and corresponds to a feed point of the PCB in position, and the two second radiators are arranged in the first radiator, connected to the first radiator, and respectively located on two sides of the feed branch. The 5G MIMO antenna structure has a good radiation effect, a good isolation effect and a smaller size, and can meet the usage requirements of a 5G system below 6 GHz.

8 Claims, 5 Drawing Sheets

(51) Int. Cl.
*H01Q 5/10* (2015.01)
*H01Q 21/28* (2006.01)
*H01Q 13/10* (2006.01)
*H01Q 1/22* (2006.01)
*H01Q 1/24* (2006.01)
*H04B 7/0413* (2017.01)

(58) Field of Classification Search
CPC ...... H01Q 21/28; H01Q 1/523; H01Q 1/2266;
H01Q 9/42; H01Q 5/378; H04B 7/0413
See application file for complete search history.

(56) References Cited

U.S. PATENT DOCUMENTS

| | | | | |
|---|---|---|---|---|
| 7,973,726 | B2 * | 7/2011 | Tseng | H01Q 1/243 |
| | | | | 343/700 MS |
| 8,350,774 | B2 * | 1/2013 | Pickles | H01Q 9/16 |
| | | | | 343/795 |
| 9,118,117 | B2 * | 8/2015 | Chen | H01Q 1/525 |
| 9,153,873 | B2 * | 10/2015 | Ng | H01Q 1/521 |
| 9,306,275 | B2 * | 4/2016 | Mikata | H01Q 1/50 |
| 9,379,440 | B2 * | 6/2016 | Onaka | H01Q 1/243 |
| 10,020,583 | B2 * | 7/2018 | Wu | H01Q 9/0421 |
| 10,367,266 | B2 * | 7/2019 | Wong | H01Q 21/28 |
| 2007/0290927 | A1 * | 12/2007 | Rowell | H01Q 1/36 |
| | | | | 343/700 MS |
| 2008/0258992 | A1 * | 10/2008 | Tsai | H01Q 1/2266 |
| | | | | 343/853 |
| 2010/0052997 | A1 * | 3/2010 | Kan | H01Q 1/38 |
| | | | | 343/702 |
| 2011/0102281 | A1 * | 5/2011 | Su | H01Q 1/36 |
| | | | | 343/742 |
| 2011/0122040 | A1 * | 5/2011 | Wakabayashi | H01Q 9/16 |
| | | | | 343/833 |
| 2012/0212389 | A1 * | 8/2012 | Aizawa | H01Q 21/28 |
| | | | | 343/853 |
| 2012/0274536 | A1 * | 11/2012 | Pan | H01Q 1/38 |
| | | | | 343/853 |
| 2012/0287012 | A1 * | 11/2012 | Aizawa | H01Q 1/243 |
| | | | | 343/853 |
| 2013/0162496 | A1 * | 6/2013 | Wakabayashi | H01Q 21/00 |
| | | | | 343/853 |
| 2013/0257674 | A1 * | 10/2013 | Li | H01O 5/378 |
| | | | | 343/853 |
| 2014/0085164 | A1 * | 3/2014 | Kashiwagi | H01Q 1/2266 |
| | | | | 343/893 |
| 2016/0093949 | A1 * | 3/2016 | Chang | H01Q 1/526 |
| | | | | 343/841 |
| 2017/0162948 | A1 * | 6/2017 | Wong | H01Q 5/10 |
| 2017/0256854 | A1 | 9/2017 | Hu | |
| 2018/0212304 | A1 * | 7/2018 | Peng | H01Q 3/24 |
| 2018/0309186 | A1 * | 10/2018 | Yu | H01Q 1/243 |
| 2020/0067172 | A1 * | 2/2020 | Park | H01Q 15/14 |

FOREIGN PATENT DOCUMENTS

CN 106856261 A 6/2017
WO 2016/034900 A1 3/2016

* cited by examiner

5G MIMO ANTENNA STRUCTURE

TECHNICAL FIELD

The invention relates to the technical field of wireless communications, in particular to a 5G MIMO antenna structure.

DESCRIPTION OF RELATED ART

With the rapid development of the wireless communication technology, the fifth-generation (5G) wireless communication system will be gradually used commercially. The low-frequency band below 6 GHz and the millimeter-wave frequency band over 6 GHz are two main frequency bands adopted by the 5G wireless communication system, wherein one of the main 5G frequency bands below 6 GHz is 3.5 GHz, and one of the main 5G millimeter-wave frequency bands over 6 GHz is 28 GHz. As for the 5G system below 6 GHz, MIMO (multiple-input multiple-output) antennas will be used to increase the transmission rate of the 5G system.

In order to meet the requirement for the 5G transmission rate, about eight MIMO antennas should be adopted generally. However, due to the fact that the space of handheld devices such as mobile phones is limited, the primary issue to be settled for the MIMO antenna system is how to design small-sized antennas. In addition, another issue to be settled for the MIMO antenna system is how to reduce the isolation between the antennas. Solutions to reducing the isolation between the antennas have been widely studied and discussed. For instance, isolation strips are added between two adjacent antennas, slots are formed in the PCB of the system, isolation networks are adopted, and neutralization lines having an isolation effect are added between the antennas. However, no matter which one of these designs is adopted, the complexity and design difficulty of the antennas will be increased, and antenna tuning in the later stage will become more difficult.

BRIEF SUMMARY OF THE INVENTION

The technical issue to be settled by the invention is to provide a 5G MIMO antenna structure which is simple in structure, small in size, and capable of effectively reducing the isolation.

The technical solution adopted by the invention to settle the above technical issue is as follows:

A 5G MIMO antenna structure comprises a PCB and more than one first antenna assembly arranged on the PCB at intervals. Each first antenna assembly comprises a feed branch, a first radiator, and two second radiators, wherein the first radiator and the two second radiators are coupled to the feed branch; the first radiator is of an inverted U-structure and has two tail ends connected to grounding points of the PCB; the feed branch is located in the first radiator and corresponds to a feed point of the PCB in position; and the two second radiators are arranged in the first radiator, connected to the first radiator, and respectively located on two sides of the feed branch.

The invention has the following beneficial effects: an enclosed structure is defined by the first radiators and the PCB, and the first antenna radiators have an antenna radiation function as well as an isolation function relative to the adjacent antenna assemblies, so that the antenna assemblies have the characteristic of self-isolation; and the second radiators greatly increase the effective length of the current path of the antenna assemblies, and the size of an antenna can be reduced with the increase of the effective length of the antenna. Compared with a traditional antenna structure, the length of the antenna assemblies of the invention is greatly reduced.

REFERENCE SIGNS

1, PCB; 2, first antenna assembly; 21, feed branch; 22, first radiator; 23, second radiator; 24, slot; 3, second antenna assembly; 4, third antenna assembly.

DETAILED DESCRIPTION OF THE INVENTION

The technical solutions, objectives, and effects of the invention are expounded below with reference to embodiments and accompanying drawings.

The key conception of the invention lies in that: an inverted U-shaped first radiator 22 having two tail ends connected to a PCB 1 is configured, a feed branch 21 and two second radiators 23 are arranged in the first radiator 22, the two second radiators 23 are respectively located on the left side and the right side of the feed branch 21, and one end of each second radiator 23 is connected to the first radiator 22.

Figure 1:
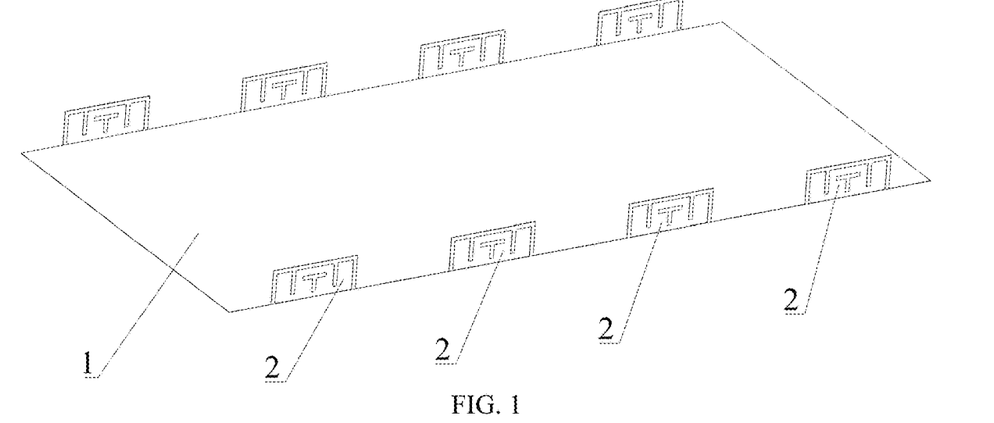
FIG. 1 is an overall structural view of a 5G MIMO antenna structure in Embodiment 1 of the invention.
Figure 2:
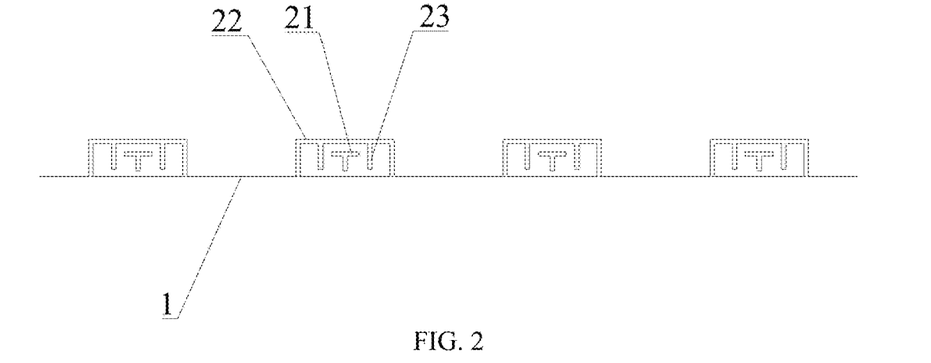
FIG. 2 is a side view of the 5G MIMO antenna structure in Embodiment 1 of the invention.

Referring to FIG. 1 and FIG. 2, a 5G MIMO antenna structure comprises a PCB 1 and more than one first antenna assembly 2 arranged on the PCB 1 at intervals. Each first antenna assembly 2 comprises a feed branch 21, a first radiator 22, and two second radiators 23, wherein the first radiator 22 and the two second radiators 23 are coupled to the feed branch 21; the first radiator 22 is of an inverted U-structure and has two tail ends connected to grounding points of the PCB 1; the feed branch 21 is located in the first radiator 22 and corresponds to a feed point of the PCB 1 in position; and the two second radiators 23 are arranged in the first radiator 22, connected to the first radiator 22, and respectively located on two sides of the feed branch 21.

From the above description, the invention has the following beneficial effects: an enclosed structure is defined by the first radiators 22 and the PCB 1, and the first antenna radiators have an antenna radiation function, as well as an isolation function relative to adjacent antenna assemblies, so that the antenna assemblies have the characteristic of self-isolation, and the second radiators 23 greatly increase the effective length of the current path of the antenna assemblies, and the size of an antenna can be reduced with the increase of the effective length of the antenna. Compared with a traditional antenna structure, the length of the antenna assemblies of the invention is greatly reduced.

Furthermore, top ends of the second radiators 23 are connected to the first radiator 22, and bottom ends of the second radiators 23 are spaced from the PCB 1.

From the above description, the effective current path is effectively prolonged by the combination of the second radiators 23 and the first radiator 22.

Furthermore, the feed branch 21 is in a T shape.

Furthermore, the first antenna assembly 2 is of an axisymmetric structure with the center line of the feed branch 21 as an axis of symmetry.

From the above description, the effective current paths on the left side and the right side of the first antenna assembly 2 are effectively kept consistent.

Furthermore, the number of the first antenna assemblies 2 is an even number and is more than four, and the more-than-four first antenna assemblies 2 are symmetrically distributed on two opposite sides of the PCB 1.

From the above description, a 5G 8*8 MIMO antenna system is suitable for handheld devices, and a plurality of first antenna assemblies 2 are configured on each of the left side and the right side of the PCB 1 at equal intervals or unequal intervals.

Figure 9:
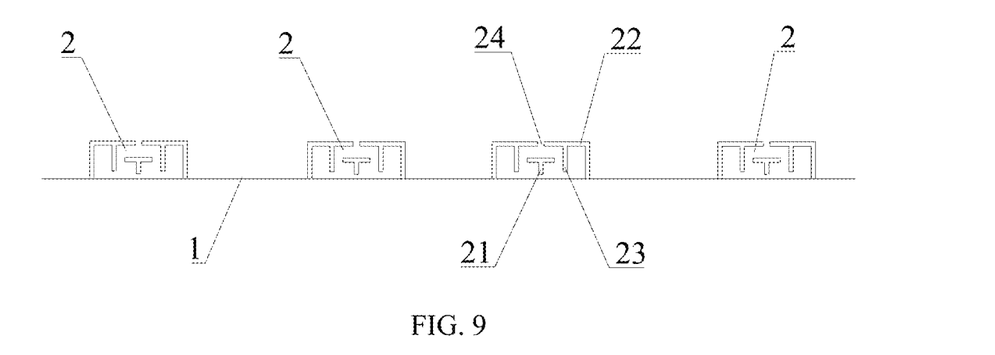
FIG. 9 is a side view of a 5G MIMO antenna structure in Embodiment 2 of the invention.

Furthermore, a slot is formed in the middle of the top of the first radiator 22, so that the U-structure is divided into two separated L-structures.

From the above description, the tiny slot 24 is formed in the middle of the first radiator 22 of the antenna, so that the resonance frequency of the antenna can be finely adjusted.

Figure 10:
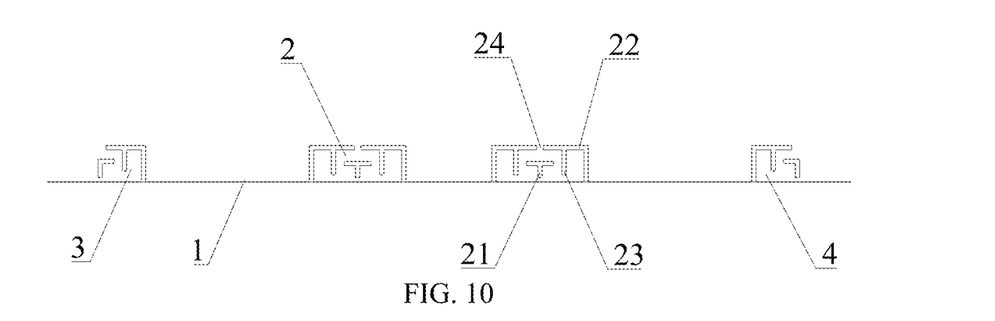
FIG. 10 is a side view of a 5G MIMO antenna structure in Embodiment 3 of the invention.

Furthermore, the 5G MIMO antenna structure further comprises second antenna assemblies 3 and third antenna assemblies 4, wherein the second antenna assemblies 3 and the third antenna assemblies 4 are respectively arranged at two opposite ends of the PCB 1, and the first antenna assemblies 2 are arranged in the middle of the PCB 1.

From the above description, the small-sized and self-isolation first antenna assemblies 2 are arranged between the second antenna assemblies 3 and the third antenna assemblies 4, so that the size of the whole antenna structure is made small, and each antenna assembly is isolated from the adjacent antenna assemblies.

Furthermore, the second antenna assemblies 3 and the third antenna assemblies 4 are respectively arranged on left sides and right sides of the first antenna assemblies 2, the second antenna assemblies 3 are identical with right halves of the first antenna assemblies in structure, and the third antenna assemblies 4 are identical with left halves of the first antenna assemblies 2.

From the above description, in the antenna structure, the second antenna assemblies 3 are identical with one of the two halves of the first antenna assemblies 2, the third antenna assemblies 4 are identical with the other of the two halves of the first antenna assemblies 2, the second antenna assemblies 3 are adjacent to the left halves of the first antenna assemblies 2 and back onto the left halves of the first antenna assemblies 2, so that the second antenna assemblies 3 are isolated from the first antenna assemblies 2. Similarly, the third antenna assemblies 4 are adjacent to the right halves of the first antenna assemblies 2 and back onto the right halves of the first antenna assemblies 2, so that the third antenna assemblies 4 are also isolated from the first antenna assemblies 2. In this way, an equivalent radiation effect is realized, and the overall size of the antenna structure is further decreased.

Furthermore, the 5G MIMO antenna structure further comprises a plastic bracket, wherein the first antenna assemblies 2, the second antenna assemblies 3, and the third antenna assemblies 4 are fixed to the plastic bracket.

Furthermore, the two L-structures are symmetrical with respect to the slot.

From the above description, the first antenna assembly provided with the slot still remains bilaterally symmetrical.

Embodiment 1

Embodiment 1: Referring to FIG. 1 and FIG. 2, the 5G MIMO antenna structure is mainly applied to communication devices such as mobile phones to fulfill 5G communications and co-exists with a 4G LTE communication system (or other antennas such as GPS antennas). As the existing 4G LTE antennas have been configured on two short edges of the mobile phones, the 5G MIMO antenna system is preferably configured on two long edges of the mobile phones.

The 5G MIMO antenna structure mainly comprises a PCB 1 and more than one first antenna assembly 2 arranged on the PCB 1 at intervals. In this embodiment, the PCB 1 has a size of 150 mm*75 mm*0.8 mm, and the number of the first antenna assemblies 2 is eight, the eight first antenna assemblies 2 are symmetrically distributed on two long edges of the PCB 1, and the first antenna assemblies 2 on each edge are uniformly spaced from one another.

Each first antenna assembly 2 comprises a T-shaped feed branch 21, a first radiator 22 and two second radiators 23, wherein the first radiator 22 and the two second radiators 23 are coupled to the T-shaped feed branch 21; the feed branch 21, the first radiator 22 and the second radiators 23 are all arranged on a plastic bracket; the first radiator 22 is of an inverted U-structure and has two tail ends connected to grounding points of the PCB 1; the feed branch 21 is located in the first radiator 22 and corresponds to a feed point of the PCB 1 in position; the two second radiators 23 are located in the first radiator 22 and connected to the first radiator 22, and the two radiators 23 are respectively located on two sides of the feed branch 21; and the second radiators 23 are linear or nonlinear; preferably, the second radiators 23 are linear and are parallel to two sides of the first radiator 22; top ends of the second radiators 23 are connected to the first radiator 22, and bottom ends of the second radiators 23 are spaced from the PCB 1; and first antenna assembly 2 is of an axisymmetric structure with the center line of the feed branch 21 as an axis of symmetry.

Figure 3:
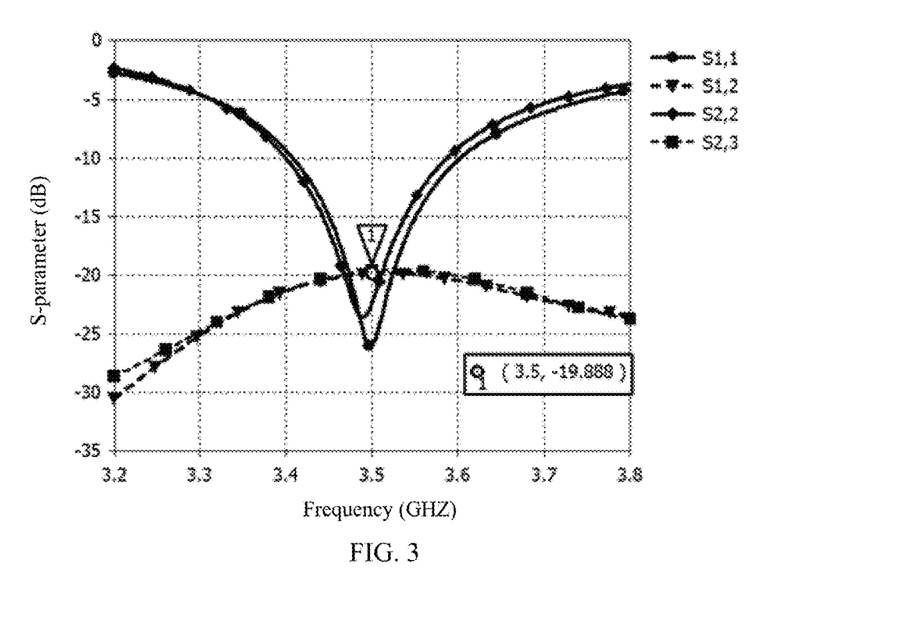
FIG. 3 is an S-parameter diagram of the 5G MIMO antenna structure in Embodiment 1 of the invention.

The length of the first antenna assembly 2 (the distance between two grounding points of the first radiator 22 of the antenna structure) is represented by L. The sizes of the feed branch 21, and the first radiator 22 and the second radiators 23 coupled to the feed branch 21, as well as the distances between the feed branch 21, the first radiator 22 and the second radiators 23 can be adjusted to generate a resonance frequency required by a 5G MIMO antenna system. The 8*8 MIMO antenna is simulated under the condition of L=17.5 mm, and the following results are obtained: FIG. 3 is an S-parameter diagram of four first antenna assemblies 2 on one side of the PCB (note: as the 5G MIMO antenna structure is symmetrical with respect to the center of the PCB 1, only the results of necessary antenna units are shown in FIG. 3, the same below); and as can be seen from FIG. 3, the antenna operates within 3.4-3.6 GHz, and the isolation between the antenna assemblies is about −20 dB, so that the design requirements of a MIMO antenna system are met. The results shown in FIG. 3 are obtained under the condition where the distances between the feed points of the four antenna units are equal, while the distance between the antenna units can be properly adjusted to further optimize the isolation between antennas.

Figure 4:
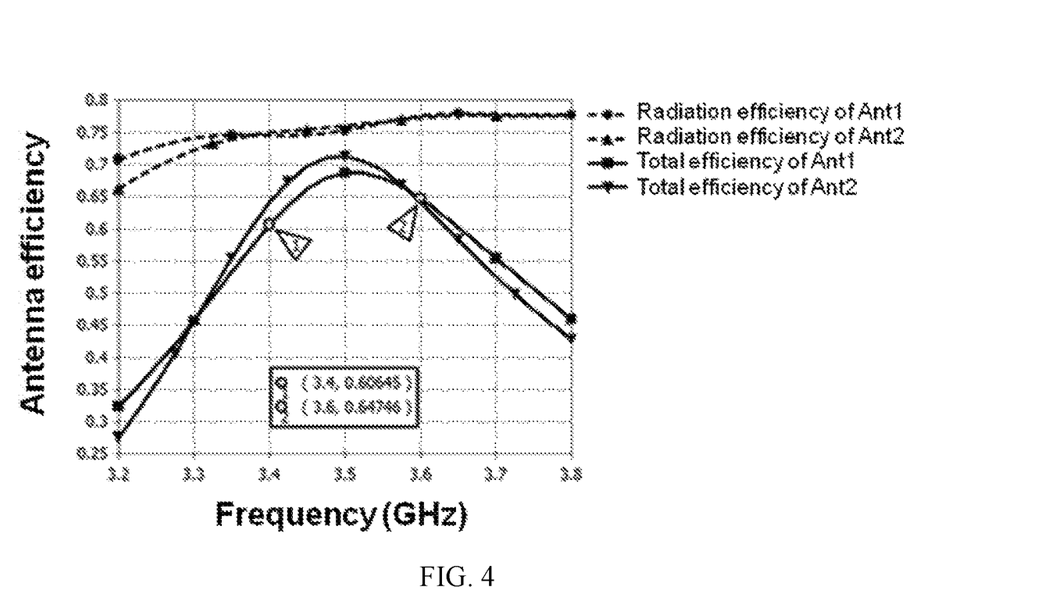
FIG. 4 is a curve chart of the variation with frequency of the radiation efficiency and overall antenna efficiency of the 5G MIMO antenna structure in Embodiment 1 of the invention.

FIG. 4 is a curve chart of the variation with frequency of the radiation efficiency and the overall antenna efficiency of the antenna. As can be seen from FIG. 4, when the antenna operates within 3.4-3.6 GHz, the overall antenna efficiency is better than 60%. The antenna indexes shown in FIG. 3 and FIG. 4 completely meet the usage requirements of the 5G MIMO antenna structure below 6 GHz in mobile phones.

Figure 5:
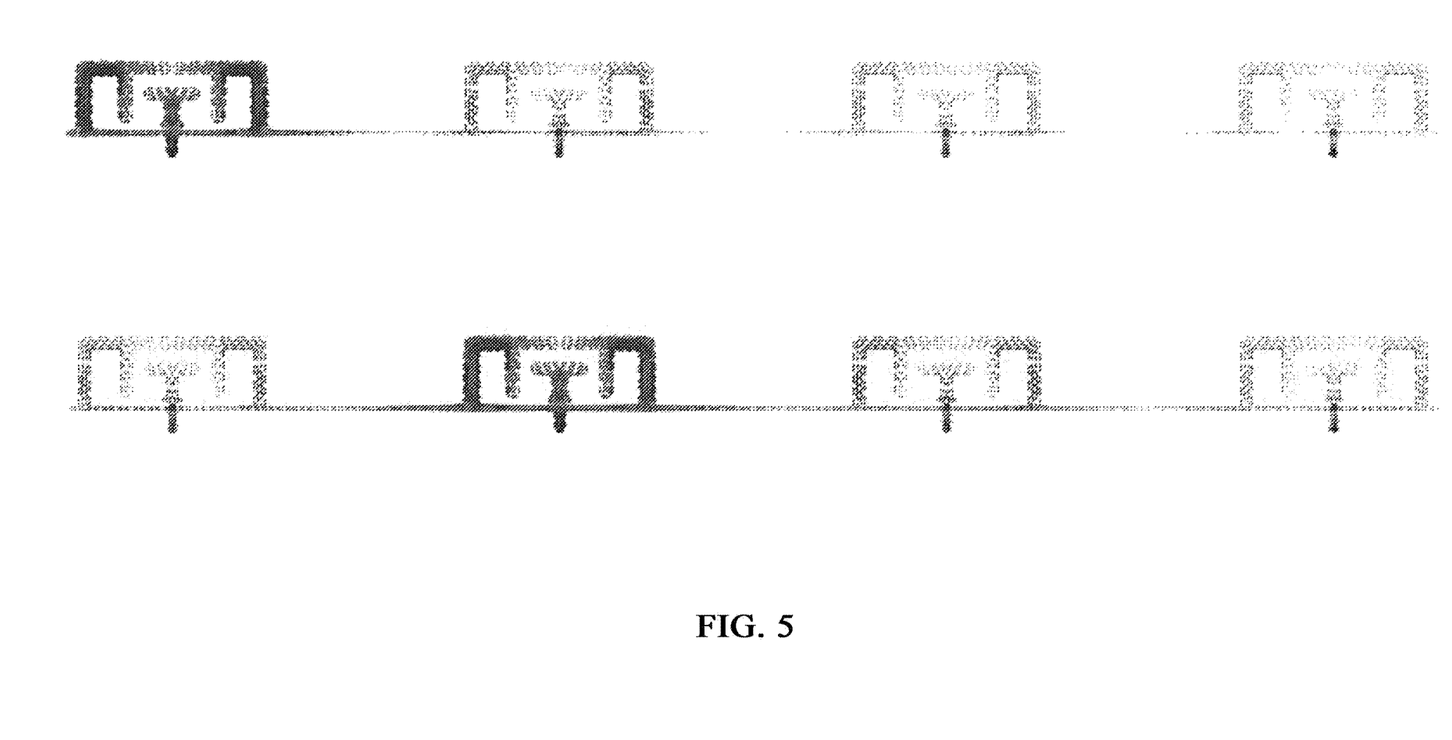
FIG. 5 is a current distribution diagram when two first antenna assemblies operate independently in Embodiment 1 of the invention.

The operating principle of the antenna structure can be visually seen by observation and analysis of the distribution of the antenna current on different antenna units when the four first antenna assemblies 2 on one side of the PCB operate at a frequency of 3.5 GHz. For the sake of a brief illustration, only the operating condition of the front two first antenna assemblies 2 is analyzed and discussed. FIG. 5 is a current distribution diagram of the front two first antenna assemblies 2 in operation. As can be clearly seen from FIG. 5, the maximum current intensity is distributed inside the antenna assemblies in operation, which is different from other poor-isolation MIMO antenna systems having strong currents or energy penetrating into antenna units adjacent to the antenna unit in operation. This is exactly the reason why the antenna system of this application has good isolation. Particularly, the first radiators 22 of the first antenna assemblies 2 have a good antenna radiation function as well as an isolation function relative to adjacent antenna assemblies. Thus, the antenna structure in this application has the characteristic of self-isolation.

Figure 6:
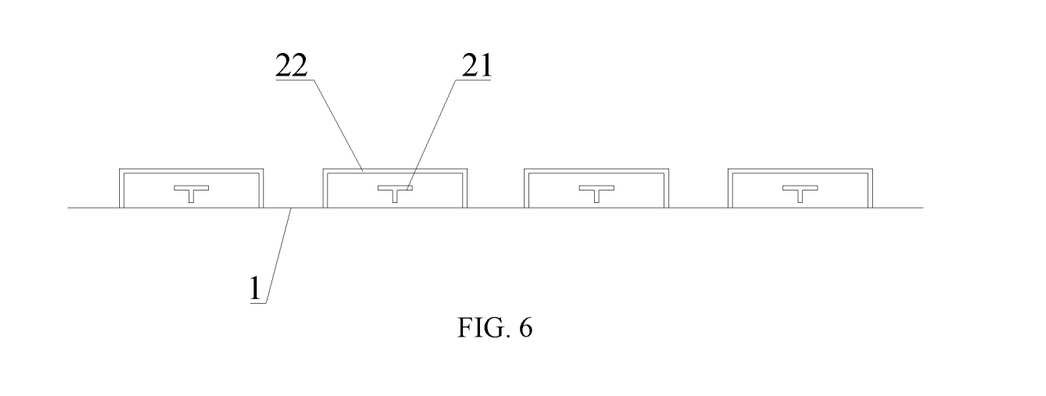
FIG. 6 is a structural view of a traditional antenna.
Figure 7:
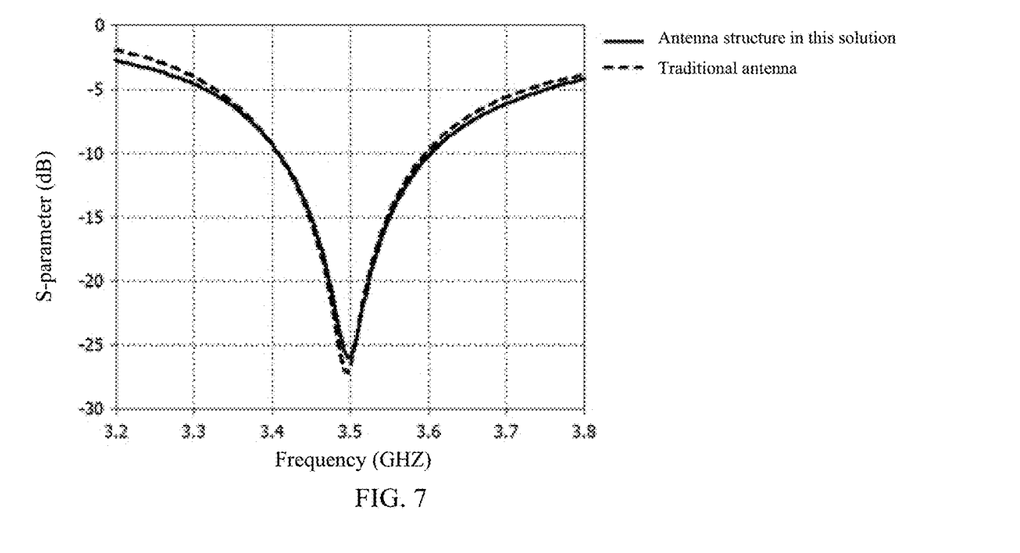
FIG. 7 is a comparison diagram of the return loss of the 5G MIMO antenna structure in Embodiment 1 of the invention and the return loss of the traditional antenna.
Figure 8:
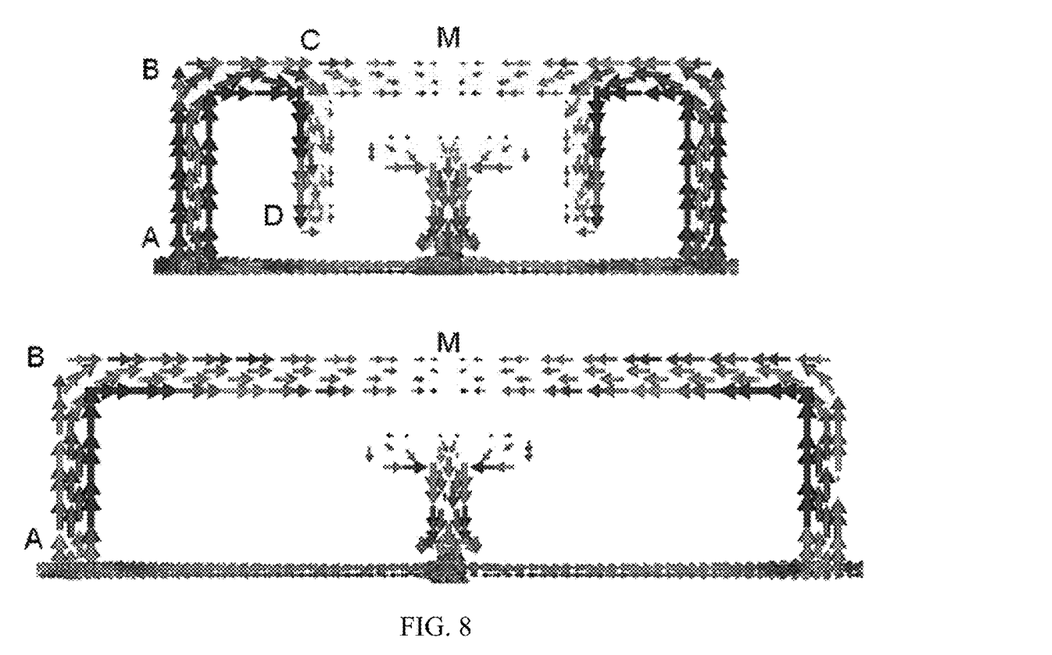
FIG. 8 is a comparison diagram of the current distribution of the 5G MIMO antenna structure in Embodiment 1 of the invention and the current distribution of the traditional antenna.

By introduction or adoption of the second radiators 23, the antenna structure of the invention has a small size. In order to explain the function and effect of the second radiators in reducing the antenna size, the antenna structure of the invention is compared with a tradition antenna (provided with first radiators 22, but is not provided with second radiators 23). FIG. 6 is a schematic diagram of the side structure of the traditional antenna. As can be seen from FIG. 6, the side structure of the traditional antenna is almost the same as the small-sized antenna structure of the invention, and particularly, the traditional antenna is provided with a T-shaped feed branch 21 and a first radiator 22 having two ends connected to grounding points of a PCB 1. The length of the traditional antenna (the distance between the two grounding points of the first radiator 22 of the antenna) is represented by L1, and the height of the antenna is kept unchanged. FIG. 7 is a comparison diagram of the return loss of the antenna structure of the invention and the return loss of the traditional antenna. As can be seen from FIG. 7, when the antenna structure of this application and the traditional antenna operate within the frequency band of 3.4-3.6 GHz, the length L1 of the traditional antenna is 25 mm Thus, compared with the traditional antenna, the length of an antenna can be reduced by about 30% by adoption of the antenna structure of the invention. For a further explanation of the reason why the antenna structure of the invention has a small size, FIG. 8 shows a current distribution diagram of the first antenna assembly 2 of the invention and a traditional antenna assembly operating at a frequency of 3.5 GHz. As can be seen from FIG. 8, the current at the center point M of the traditional antenna and the current at the center point M of the antenna structure of the invention are always 0 due to the symmetry of the antennas. However, the current path of the traditional antenna is ABM, and the current intensity of the traditional antenna is gradually decreased from point A to point M until it reaches 0; in contrast, the current intensities at point D and point M of the antenna structure of the invention are different: the current at point M is 0, while the current at point D is not 0 and is very strong. Thus, the antenna structure of the invention has two current paths: ABCD and ABCM, and under the effect of the current intensity, path ABCD is the primary current path. Compared with the traditional antenna, the antenna structure possessing this characteristic has the following beneficial effects: the effective length of the current path is greatly increased (note: the effective length mentioned herein refers to the superposition of the physical length and the current intensity of the antenna structure), and on the premise that the physical length of the radiators is constant, the effective length of the antenna structure is increased with the increase of the current intensity, and accordingly, the size of the antenna structure is made smaller. Therefore, compared with the traditional antenna structure, the length of the antenna structure of the invention is greatly decreased.

Embodiment 2

Referring to FIG. 9, this embodiment is an improvement on Embodiment 1. In this embodiment, a slot 24 is formed in the middle of the top of the first radiator 22 of each first antenna assembly 2, so that the U-structure is divided into two separated L-structures which are symmetrical with respect to the slot. The resonance frequency of the antenna can be fine adjusted by means of the slot, and the antenna is still kept bilaterally symmetrical.

Embodiment 3

Referring to FIG. 10, this embodiment is an improvement on Embodiment 2. In this embodiment, the number of the first antenna assemblies 2 is four, and the 5G MIMO antenna structure further comprises two second antenna assemblies 3 and two third antenna assemblies 4, wherein the second antenna assemblies 3 and the third antenna assemblies 4 are respectively arranged at two opposite ends of the PCB 1, and the first antenna assemblies 2 are arranged in a middle of the PCB 1. As shown in FIG. 10, the second antenna assemblies 3 and the third antenna assemblies 4 are respectively arranged on the left sides and the right sides of the first antenna assemblies 2, the second antenna assemblies are identical with right halves of the first antenna assemblies 2 in structure, and the third antenna assemblies 4 are identical with left halves of the first antenna assemblies in structure. The design of configuring half the antenna structure at two ends of mobile phones is also applicable to the condition where no small slot 24 is formed in the middle of the first radiator 22. The overall size of the 5G MIMO antenna structure in this embodiment can be further reduced.

In conclusion, the 5G MIMO antenna structure of the invention has a good radiation effect, a good isolation effect and a much smaller size, and can meet the usage requirements of the 5G system below 6 GHz and satisfy the current demand for a small size.

The above embodiments are only preferred ones of the invention and are not intended to limit the patent scope of the invention. All equivalent transformations based on the contents of specification and the accompanying drawings, or direct or indirect applications to other relevant technical fields should also fall within the patent protection scope of the invention.

The invention claimed is:

1. A 5G MIMO antenna structure, comprising a PCB and more than one first antenna assembly arranged on the PCB at intervals, wherein each said first antenna assembly comprises a feed branch, a first radiator and two second radiators; the first radiator and the two second radiators are coupled to the feed branch, the first radiator is of an inverted U-structure and has two tail ends connected to grounding points of the PCB; the feed branch is located in the first radiator and corresponds to a feed point of the PCB in position; and the two second radiators are located in the first radiator, connected to the first radiator, and respectively located on two sides of the feed branch;

wherein the 5G MIMO antenna structure further comprises second antenna assemblies and third antenna assemblies, the second antenna assemblies and the third antenna assemblies are respectively arranged at two opposite ends of the PCB, and the first antenna assemblies are arranged in a middle of the PCB; and wherein the second antenna assemblies and the third antenna assemblies are respectively arranged on left sides and right sides of the first antenna assemblies, the second antenna assemblies are identical with right halves of the first antenna assemblies in structure, and the third antenna assemblies are identical with left halves of the first antenna assemblies in structure.

2. The 5G MIMO antenna structure according to claim 1, wherein top ends of the second radiators are connected to the first radiator, and bottom ends of the second radiators are spaced from the PCB.

3. The 5G MIMO antenna structure according to claim 1, wherein the feed branch is in a T shape.

4. The 5G MIMO antenna structure according to claim 1, wherein each said first antenna assembly is of an axisymmetric structure with a center line of the feed branch as an axis of symmetry.

5. The 5G MIMO antenna structure according to claim 1, wherein the number of the first antenna assemblies is an even number and is more than four, and the more-than-four first antenna assemblies are symmetrically distributed on two opposite sides of the PCB.

6. The 5G MIMO antenna structure according to claim 1, wherein a slot is formed in a middle of a top of the first radiator, so that the U-structure is divided into two separated L-structures.

7. The 5G MIMO antenna structure according to claim 1, wherein the 5G MIMO antenna structure further comprises a plastic bracket, and the first antenna assemblies, the second antenna assemblies and the third antenna assemblies are fixed to the plastic bracket.

8. The 5G MIMO antenna structure according to claim 6, wherein the two L-structure are symmetrical with respect to the slot.

* * * * *